United States Patent
Martin et al.

(10) Patent No.: US 7,390,418 B2
(45) Date of Patent: Jun. 24, 2008

(54) METHOD OF REDUCING CHEMICAL OXYGEN CONTAMINANTS IN WATER

(75) Inventors: Perry L. Martin, Yuba City, CA (US); Roy W. Martin, Downers Grove, IL (US)

(73) Assignee: Truox, Inc., McClellan, CA (US)

( * ) Notice: Subject to any disclaimer, the term of this patent is extended or adjusted under 35 U.S.C. 154(b) by 125 days.

(21) Appl. No.: 10/953,967

(22) Filed: Sep. 28, 2004

(65) Prior Publication Data

US 2005/0284821 A1 Dec. 29, 2005

Related U.S. Application Data

(63) Continuation-in-part of application No. 10/878,167, filed on Jun. 28, 2004, now Pat. No. 6,878,289.

(51) Int. Cl.
*C02F 1/72* (2006.01)

(52) U.S. Cl. .................................. 210/758; 210/167.1

(58) Field of Classification Search ................ 210/169, 210/259, 758, 167.1; 510/191; 252/186.43
See application file for complete search history.

(56) References Cited

U.S. PATENT DOCUMENTS

| 3,647,523 A | * | 3/1972 | Horvath et al. ............... 423/274 |
| 4,350,666 A | * | 9/1982 | Klutts ........................ 422/263 |

* cited by examiner

*Primary Examiner*—Robert Hopkins

(57) ABSTRACT

A method of cleaning water systems and an oxidizer (e.g., a potassium monopersulfate composition) that is used for the method are presented. When potassium monopersulfate is used as the oxidizer, it preferably has a low concentration (<0.5 wt. %) of potassium oxodisulfate byproduct that causes irritation. The low potassium oxodisulfate concentration allows the composition to be used more liberally than conventional potassium monopersulfate. To control the release rate of the oxidizer, the oxidizer is formed into a tablet and placed in an enclosure. The enclosure has pores such that water enters the enclosure at a controlled rate and dissolves the oxidizer. The oxidizer solution that is generated in the enclosure enters the water system through the pores. Optionally, the composition may also include a layer of coating material either under or over the enclosure that further controls the rate of oxidizer dissolution.

43 Claims, 10 Drawing Sheets

METHOD OF REDUCING CHEMICAL OXYGEN CONTAMINANTS IN WATER

RELATED APPLICATION

This application is a Continuation-in-Part application of U.S. patent application Ser. No. 10/878,167 filed on Jun. 28, 2004 now U.S. Pat. No. 6,878,289, the content of which is incorporated by reference herein.

FIELD OF INVENTION

This invention relates generally to cleaning a water system and more particularly to cleaning a water system that contains organic contaminants.

BACKGROUND

Water systems such as pools and spas have become increasingly popular in private homes, hotels, fitness centers, and resorts. To ensure that the water systems can be enjoyed safely, pool and spa water must be treated to reduce or eliminate chemical oxygen demands (COD) and/or total organic carbon (TOC) in the water. A common ingredient for treating water systems is potassium monopersulfate (PMPS), which is typically available in the form of a triple salt, $(KHSO_5)_x \cdot (KHSO_4)_y \cdot (K_2SO_4)_z$ (herein referred to as "PMPS triple salt"). The strong oxidation potential of PMPS triple salt makes it effective for decreasing the concentration of COD.

When treating water with PMPS, a high concentration of PMPS is added to the water to "shock" treat the water. A typical shock treatment dosage may be, for example, one pound of PMPS triple salt per 10,000 gallons of water per week. Although increasing the dosage makes the treatment more effective, the dosage cannot be increased beyond two pounds per 10,000 gallons of water per week because of the presence of potassium oxodisulfate ($K_2S_2O_8$), an irritating byproduct of the PMPS triple salt. Potassium oxodisulfate, which is a harsh irritant with a long half life, is inherent in most commercially available PMPS products (e.g., Oxone®). To minimize the likelihood of bathers coming in contact with potassium oxodisulfate, the shock treatment is usually performed at least half an hour before the pool/spa is to be used.

Although this shock treatment method is highly inconvenient because of the necessary interruption of the pool/spa usage, it is a prevalent method of treatment because it minimizes bathers' contact with irritating components of the PMPS product. Potassium oxodisulfate is especially problematic not only because of its highly irritating quality but also because of its high stability. Unlike PMPS, which has a fairly short half-life at elevated pH and temperature, potassium oxodisulfate lingers around in the water long after the active ingredient of the PMPS is depleted. Potassium oxodisulfate, thus, limits the frequency of pool treatment and the method by which pools/spas can be treated. For example, pool treatment would be easier if the PMPS triple salt could be added continually, in smaller dosages, to a stream of water that circulates into the pool. However, due to the high stability of potassium oxodisulfate, applying even a small dosage of a commercially available PMPS product to the return water is likely to result in a local concentration of potassium oxodisulfate that is high enough to cause irritation.

Some physical and health consequences resulting from exposure to potassium oxodisulfate are documented in the following references:

Wrbitzky R., et al., "Early reaction type allergies and diseases of the respiratory passages in employees from persulphate production," *Int. Arch. Occup. Environ. Health*, Vol. 67(6): 413-7 (1995).

Le Coz, C. J., Bezard M., "Allergic contact cheilitis due to effervescent dental cleanser: combined responsibilities of the allergen persulfate and prosthesis porosity," *Contact Dermatitis* Vol. 41(5):268-71 (November 1999).

"Consultation de Dermato-Allergologie," Clinique Dermatologique des Hopitaux, Universitaires de Strasbourg 1, France.

Yawalkar, N. et al., "T cell involvement in persulfate triggered occupational contact dermatitis and asthma," *Institute of Immunology and Allergology*, University of Bern, Inselspital, Switzerland.

In addition to the inconvenience of interrupted pool/spa usage, the periodic shock treatment has the problem of allowing the COD concentration to increase between shock treatments. Because the "shock treatment" cannot be performed too frequently, COD concentration can get too high for many bathers after a certain number of days from the previous treatment. During those days, water quality is compromised with increased levels of turbidity, chloroamines, and trihalomethane (THM). These byproducts of incomplete oxidation cause not only eye and skin irritation but also respiratory problems such as asthma. Moreover, these byproducts are known to cause severe corrosion of metal equipment around the pool/spa facility.

Furthermore, indirectly, potassium oxodisulfate weakens the effect of sanitizers that are used to disinfect water. Chlorine and bromine are some of the sanitizers that are commonly used for preventing viruses and bacteria from being transmitted among bathers, and chlorine is also used to oxidize any waste products produced by the bathers. In order for the antibacterial or viricidal effect to be significant, the oxidation potential of the water must be sustained above a certain threshold level. The following studies have confirmed that the effectiveness of these sanitizers is significantly reduced when contaminants is high:

S. Carlson, *Fundamentals of Water Disinfection*, D-8500 Nurnberg 30, Germany

K. Victorin, K. G. Hellstrom, and R. Rylander, "Redox potential measurements for determining the disinfecting power of chlorinated water," Department of Environmental Hydiene, The National Institute of Public Health and the Institute of Hygiene, Karolinska Institute, Stockholm, Sweden (October 1971).

Frank Scully, Jr. and Angela Crabb Hartman, "Disinfection Interference in Wastewater by Natural Organic Nitrogen Compounds," *Environmental Science and Technology*, vol. 30. No. 5, Department of Chemistry and Biochemistry, Old Dominion University, Norfolk Va. (1996) American Chemical Society.

Although PMPS has the ability to raise the oxidation potential of the water when many contamination sources (e.g., many bathers) lower the oxidation level, PMPS cannot be used because its use might increase the oxodisulfate level in the water to a range above the recommended level. The presence of contaminants impairs the ability of the sanitizer/oxidizer to effectively sanitize the water. Also, because of competing reactions, the ability of the halogen-based sanitizer/oxidizer to rid the water of inorganic nitrogen such as mono & dichloro amines is significantly impaired.

The currently-used periodic shock feeding method does not provide for sustained disinfection rates where contaminants are added between treatments. During the interval period between shock treatments, accumulating contaminants imposes a burden on the sanitizer/oxidizer and impairs the disinfection rate due to competing reactions. Also, as already noted, the competing reactions between accumulated organics and nitrogen contaminants for the sanitizer/oxidizer allows for increased levels of chloramines which impairs both water and air quality.

To address these issues, sophisticated control and application technologies have been employed to allow for more frequent feed of PMPS while bathers are present. The following references disclose some exemplary technologies:

U.S. Pat. No. 6,620,315 and U.S. Pat. No. 6,623,647 describe a method and apparatus that combined measuring ORP and Free Available Chlorine (FAC) to independently adjust the feed of multiple oxidizers such as chlorine and PMPS.

U.S. Pat. No. 6,409,926 and U.S. Pat. No. 6,432,234 describes a means of reducing the ORP set-point used to control the feed of the halogen based sanitizer to achieve breakpoint chlorination by feeding a coagulant to reduce the contaminants on chlorine.

U.S. Pat. No. 6,143,184 describes a process for achieving continuous breakpoint halogenation by optimizing the control of halogen-based sanitizer/oxidizer using ORP control.

U.S. Pat. No. 6,149,819 describes a process for achieving continuous breakpoint halogenation using halogen donor and PMPS controlled by an ORP controller.

In order to address the drop of oxidation potential between shock treatments, ORP control technology may be used to optimize the feed of chlorine and PMPS or coagulant to reduce the contaminants, thereby reducing the competing reactions and enhancing the chlorine's ability to achieve breakpoint chlorination. The ORP control technologies, however, have their disadvantages. For example, they require expensive chemical feed and control technology as well as extensive on-site maintenance and expertise to tune in or optimize the sequencing of the chemicals being fed.

A method of cleaning water without the expense of the ORP control technologies and restrictions of the shock treatment is desired.

SUMMARY

The invention is an oxidizing composition that includes an oxidizer tablet and an enclosure surrounding the oxidizer tablet. The enclosure has pores such that when the enclosure is placed in contact with a solvent, the solvent enters the enclosure through the pores and dissolves the oxidizer tablet to form an oxidizing solution. The oxidizing solution leaves the enclosure through the pores.

In another aspect, the invention is an oxidizing product that includes a plurality of oxidizer tablets containing an oxidizer, a layer of coating material around each of the plurality of oxidizer tablets, and an enclosure around the plurality of oxidizer tablets. The enclosure has pores such that when the enclosure is placed in contact with a solvent, the solvent enters the enclosure through the pores and dissolves the coating material and the oxidizer tablets to form an oxidizing solution. The oxidizing solution leaves the enclosure through the pores.

In yet another aspect, the invention is an oxidizing product that includes a plurality of oxidizer tablets containing an oxidizer, an enclosure around each of the plurality of oxidizer tablets, and a layer of coating material deposited over the plurality of oxidizer tablets and the enclosure. Each enclosure has pores such that when the enclosure is placed in contact with a solvent, the solvent enters the enclosure through the pores and dissolves the oxidizer tablets to form an oxidizing solution. The oxidizing solution leaves the enclosure through the pores. The coating material that is deposited over the enclosure is soluble in the solvent.

The invention is also a method of making an oxidizing composition that reduces the chemical oxygen demand of a water system containing organic contaminants. The method entails forming an oxidizer tablet and enclosing the oxidizer tablet with an enclosure. The enclosure has pores such that when the enclosure is placed in contact with a solvent, the solvent enters the enclosure through the pores and dissolves the oxidizer tablet to form an oxidizing solution. The oxidizing solution leaves the enclosure and enters the water system through the pores.

The invention includes a method of reducing the chemical oxygen demand (COD) of a water system containing organic contaminants. Reducing the COD entails obtaining an oxidizing composition containing potassium monopersulfate enclosed in an enclosure, and contacting the oxidizing composition with the water system. The potassium monopersulfate has $K_2S_2O_8$ at a concentration that is lower than about 0.5 wt. %. Due to the low $K_2S_2O_8$ concentration, the oxidizing composition may be used while a source that generates the organic contaminants is in the water system.

In another aspect, the invention is a kit for cleaning a water system that contains organic contaminants. The kit includes a potassium monopersulfate tablet placed in a porous enclosure and instructions to add the enclosed tablet to the water system during use of the water system. The enclosure contains a silicate-based material, a hydrophobic polymer, or a membrane.

DESCRIPTION OF THE PREFERRED EMBODIMENT

Figure 1:
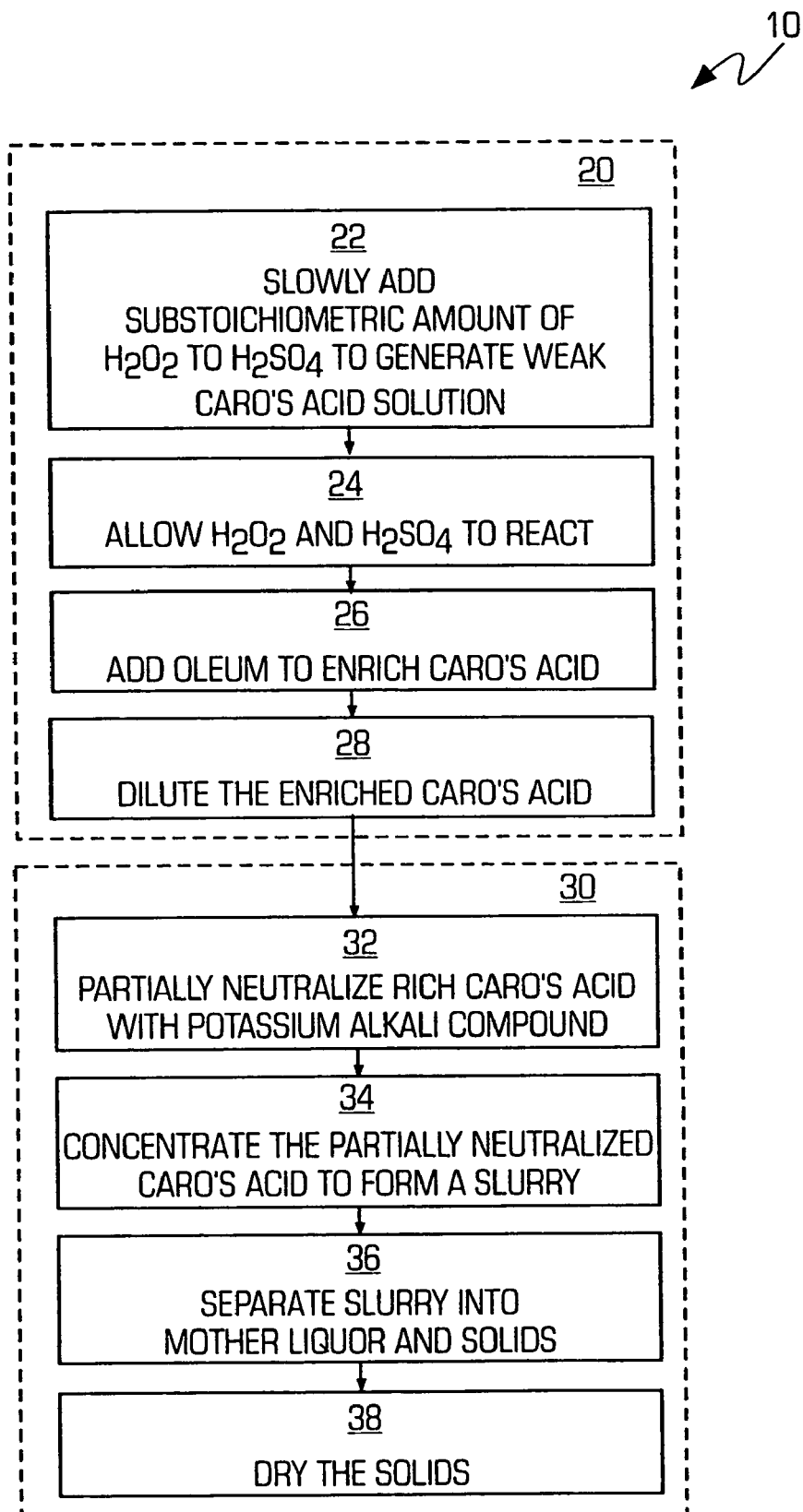
FIG. 1 is a flowchart of a triple salt production process that may be used to produce the potassium monopersulfate composition that is suitable for the invention.

As used herein, a "solvent" includes but is not limited to a body of water. "Water," as used herein, is not limited to pure water but can be an aqueous solution. An "oxidizer tablet" is a solid matter containing an oxidizer (e.g., potassium monopersulfate composition). As used herein, a "potassium monopersulfate composition" is a composition that contains $KHSO_5$, including $KHSO_5$ in its triple salt form $(KHSO_5)_x \cdot (KHSO_4)_y \cdot (K_2SO_4)_z$.

A "contaminant" refers to a substance that reacts with and consumes a sanitizer/oxidizer, and often comes in the form of organic compounds generated by users. A "user" of a water system is a person or a mammal using the water system in manner that it is intended to be used. "Chemical oxygen demand" determines the oxygen ($O_2$) consumption as a result of both biodegradable and non-biodegradable organic matters in the water. A "peroxide solution" and a "sulfuric acid solution" refer to solutions of $H_2O_2$ and water, and $H_2SO_4$ and water, respectively. "Oleum" refers to free $SO_3$ dissolved in $H_2SO_4$. A "Caro's acid solution" refers to Caro's acid ($H_2SO_5$) mixed with one or more of $H_2O_2$, $H_2O$, and $H_2SO_4$.

The terms "stabilizing" and "stabilized," when used in reference to the Caro's acid solution, indicate the suppression of the equilibrium reaction, or suppression of Reaction 1b (see below) that converts the $H_2SO_5$ back to the reactants. A "stable" potassium monopersulfate composition, on the other hand, has an active oxygen loss of <1% per month. "Non-hygroscopic" means having a K:S ratio greater than 1.

A "non-solvent" is a carrier and void producing volatile liquid in which the polymer or coating material used in forming the reactor wall is insoluble. The term is also used to describe a liquid in which the oxidizer and/or oxidizable substance is insoluble. A solvent and a non-solvent that are used together are miscible. "Amphipathic" is intended to mean that a molecule has a polar and a nonpolar domain. A "polymer," as used herein, includes a copolymer and a terpolymer. A plasticizer is a compound that alters the pliability and/or the hygroscopicity of the polymer.

The invention provides a method of sustaining a desired level of oxidation potential in a contaminant-ridden water system. The oxidizer used in the description is a PMPS triple salt having the composition $(KHSO_5)_x \cdot (KHSO_4)_y \cdot (K_2SO_4)_z$ where $x+y+z=1$ and $x=0.43-0.75$, $y=0.01-0.37$, and $z=0.01-0.40$, and having a potassium oxodisulfate concentration of less than 0.5 wt. %, preferably less than 0.2 wt. %. However, the concept disclosed herein is applicable to other oxidizers as long as the oxidizer has a low enough concentration of irritants that continuous application to the water system would be considered safe to users. A low oxodisulfate concentration in the PMPS triple salt allows the composition of the invention to be used for water treatment as frequently as desired and even continuously. The treatment method of the invention maintains a substantially constant chemical oxygen contaminants (COD) level in the water, eliminating the risk of irritation to bathers and improving the sanitation of the treated water.

Production of Low-Oxodisulfate PMPS Triple Salt

Although there are several known methods of producing potassium monopersulfate, most of these methods produce potassium monopersulfate with an oxodisulfate concentration that is too high for the invention. An exemplary method of producing potassium monopersulfate that is suitable for this invention is provided in U.S. Provisional Patent Application Ser. No. 60/505,466 filed on Sep. 23, 2003 and U.S. patent application Ser. No. 10/878,169 filed on Jun. 28, 2004, which are incorporated by reference herein in their entirety.

The PMPS triple salt is produced from Caro's acid ($H_2SO_5$, also called peroxymonosulphuric acid), which in turn is usually produced by reacting $H_2SO_4$ with $H_2O_2$. Caro's acid is a product of the following two equilibrium reactions:

  (Reaction 1a)

  (Reaction 1b)

Reaction 1a is herein referred to as the "forward reaction," and Reaction 1b is herein referred to as the "reverse reaction." $H_2SO_4 + H_2O_2$ are herein referred to as the "reactants." As the water content increases, the rate of forward reaction decreases. Also, as the concentrations of the reactants become reduced due to the forward reaction, the rate of the forward reaction decreases. The Caro's acid is reacted with alkali potassium salts such as $KHCO_3$, $K_2CO_3$, and/or $KOH$ to generate $KHSO_5$ according to the following reaction:

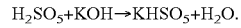

First Example of Low-Oxodisulfate PMPS Production

The Caro's acid composition resulting from controlling the order of reactant addition (i.e., adding $H_2O_2$ to $H_2SO_4$) and thereby obtaining a supra-stoichiometric to stoichiometric ratio of $H_2SO_4$ to $H_2O_2$, results in a higher active oxygen content from $H_2SO_5$. The resulting Caro's acid solution can be stabilized to maintain a high $H_2SO_5$ concentration. By stabilizing the Caro's acid solution and reducing the reverse reaction between $H_2SO_5$ and $H_2O$, a Caro's acid solution is produced which, upon partial neutralization with an alkali potassium, produces a PMPS triple salt having a K/S ratio of between 1.15 to 1.25. Such PMPS triple salt has an active oxygen content (A.O.) higher than that of PMPS triple salt made with conventional methods, and does not suffer from the drawbacks of $K_2S_2O_8$ formation.

Upon slow (continuous or incremental) addition of $H_2O_2$ and/or Caro's acid solution to $H_2SO_4$ under a temperature at or below 20° C., the rate of the forward reaction is initially high due to the excess $H_2SO_4$ and low $H_2O$ concentration. With continued addition of $H_2O_2$, the $H_2SO_5$ converts back to $H_2SO_4$. However, the controlled temperature suppresses the rate of conversion of $H_2SO_5$ even as the $H_2O$ concentration increases. The reversion rate is sufficiently reduced to allow for the benefits provided by the order of reactant addition to be utilized in the production of a triple salt composition. The resulting triple salt is substantially higher in A.O. than the conventional triple salt.

FIG. 1 is a flowchart of a triple salt production process 10 in accordance with the invention. The triple salt production process 10 includes a Caro's acid production process 20 and a conversion and separation process 30. In the Caro's acid production process 20, an $H_2O_2$ solution is slowly (e.g., incrementally) added to an $H_2SO_4$ solution, maintaining a substoichiometric ratio of $H_2SO_4$: $H_2O_2$ (step 22). Preferably, the $H_2O_2$ solution has a $H_2O_2$ concentration >70%. This slow addition increases the conversion of $H_2O_2$ to $H_2SO_5$ and increases the release of bound $H_2O$ from the $H_2O_2$. As a result, there is more free $H_2O$ in the solution. The resulting weak Caro's acid still contains residual $H_2O_2$ and free $H_2O$, which lead to a higher active oxygen content. The amount of residual $H_2O_2$ is minimized by stopping its addition as soon as the stoichiometric molar ratio of $H_2SO_4$: $H_2O_2$ is reached or exceeded. The $H_2O_2$ and the $H_2SO_4$ are allowed to react for at least 0.1 hours (step 24).

Then, oleum is added (step 26) to the weak (i.e., substoichiometric molar ratio of total $H_2SO_4$ to $H_2O_2$) Caro's acid solution, which still contains residual $H_2O_2$ and free $H_2O$, to raise the molar ratio of $SO_4$ to $H_2O_2$ to at least the stoichiometric level. Upon the addition of oleum, the free $H_2O$ reacts with $SO_3$, per Reaction 2. By minimizing residual $H_2O_2$, formation of $H_2S_2O_8$ per Reaction 3 is minimized. After step 26, a rich Caro's acid is produced. The rich Caro's acid is optionally diluted (step 28). Temperature is maintained at a level <20° C. throughout the process 20 to stabilize the $H_2SO_5$.

The rich Caro's acid is subjected to the process 30 to form a PMPS triple salt with high A.O. and a substantially reduced amount of $K_2S_2O_8$ compared to the conventional triple salts. The diluted Caro's acid solution is partially neutralized with an alkali potassium compound (step 32) to achieve a K/S ratio greater than 1, preferably between 1.10 to 1.25. The partially neutralized solution is concentrated to form a slurry (step 34), for example by mixing in a vacuum evaporator. The slurry is then separated into mother liquor and solids (step 36), wherein the solids contain the desired PMPS composition. The solids are dried (step 38), preferably at a temperature <90° C. and more preferably at a temperature <70° C., to obtain a PMPS composition that does not have much $H_2O$. The resulting PMPS composition has an active oxygen content higher than 4.3 and has substantially no irritant ($K_2S_2O_8$).

The PMPS triple salt formed with the method of FIG. 1 is usually solid at room temperature.

1. Recipe #1

28.54 g of 70% $H_2O_2$ (approx. 0.59 mol $H_2O_2$) was added drop-wise to 60.02 g of vigorously agitated 93% $H_2SO_4$ (approx. 0.57 mol $H_2SO_4$) while controlling the temperature with an ice/brine solution between 5-8° C. The addition took 2.5 hrs and produced a Caro's acid solution from almost a 1:1 molar ratio of $H_2SO_4$ to $H_2O_2$.

The Caro's acid solution was allowed to react with vigorous agitation for 60 minutes while the temperature was maintained at 2-5° C.

The Caro's acid solution was diluted with 47.5 g deionized $H_2O$ by addition of the Caro's acid to the water with vigorous agitation while controlling the temperature between 10-15° C.

48.78 g $K_2CO_3$ was diluted with 66.98 g deionized $H_2O$. This solution was added drop-wise to the vortex of the vigorously agitated solution of diluted caro's acid to raise the K/S ratio to 1.2. Temperature was varied between 11-17° C. Total lapsed time to complete the addition was 18 minutes.

The solution was transferred to a glass evaporation tray and placed on a hot plate. A fan was used to increase air circulation and reduce the pressure above the solution. The temperature was controlled between 28-30° C. while continuous mixing was applied.

After 1.75 hrs, the solution was concentrated to a thick paste. The paste was spread across the tray and the temperature was increased to induce drying. The triple salt was periodically mixed and crushed to increase the efficiency of drying. The resulting triple salt had an A.O. content of 4.82% and no $K_2S_2O_8$.

This Example produces a triple salt composition having an A.O. that is 12% greater than the level that is expected from the equilibrium between a 1:1 molar ratio of 96% $H_2SO_4$ to 70% $H_2O_2$. Also, the triple salt produced in this Example has a higher $KHSO_5$ content than the triple salts produced using some of the well known methods. These results clearly demonstrate that the rate of the equilibrium reaction can be suppressed to benefit from the supra-stoichiometric ratio induced by the order of reactant addition for the formation of a triple salt composition.

2. Recipe #2

20.54 g of 76% $H_2O_2$ (approx. 0.46 mol $H_2O_2$) was slowly added to 10.02 g 98% $H_2SO_4$ (approx. 0.1 mol $H_2SO_4$).

46.67 g of 26% oleum was slowly added through a drip tube to the weak Caro's acid over a period of 1.5 hours.

The temperature was maintained at between −2 to 8° C. during both steps of the Caro's acid production.

The rich Caro's acid solution was added to 47.23 g deionized $H_2O$ while controlling the temperature between 0-6° C.

48.89 g $K_2CO_3$ was diluted with 59.95 g of deionized $H_2O$ and slowly added to the cortex of the rich Caro's acid, K/S 1.18.

The solution was concentrated using evaporation techniques described in the previous examples to a thick paste. 1.02 g magnesium carbonate hydroxide pentahydrate was added, then the solids were dried.

The resulting triple salt contains 6.3% A.O. and no $K_2S_2O_8$.

This Example illustrates that $H_2O$ bound in the $H_2O_2$ can be effectively released by utilizing the steps of the invention, then reacted with $SO_3$ in the oleum to produce a triple salt free of $K_2S_2O_8$.

3. Recipe #3

Add a supra-stoichiometric ratio of 70-99.6% $H_2O_2$ to agitated 90-100% $H_2SO_4$ while controlling the temperature at $\leq$20° C., and preferably $\leq$15° C., and more preferably $\leq$10° C. The resulting weak Caro's acid solution is converted to a rich Caro's acid solution by slowly or incrementally adding to a solution of 1-75% oleum while controlling the temperature at $\leq$20° C., preferably $\leq$15° C., and more preferably $\leq$10° C. to produce a rich Caro's acid solution.

Figure 2:
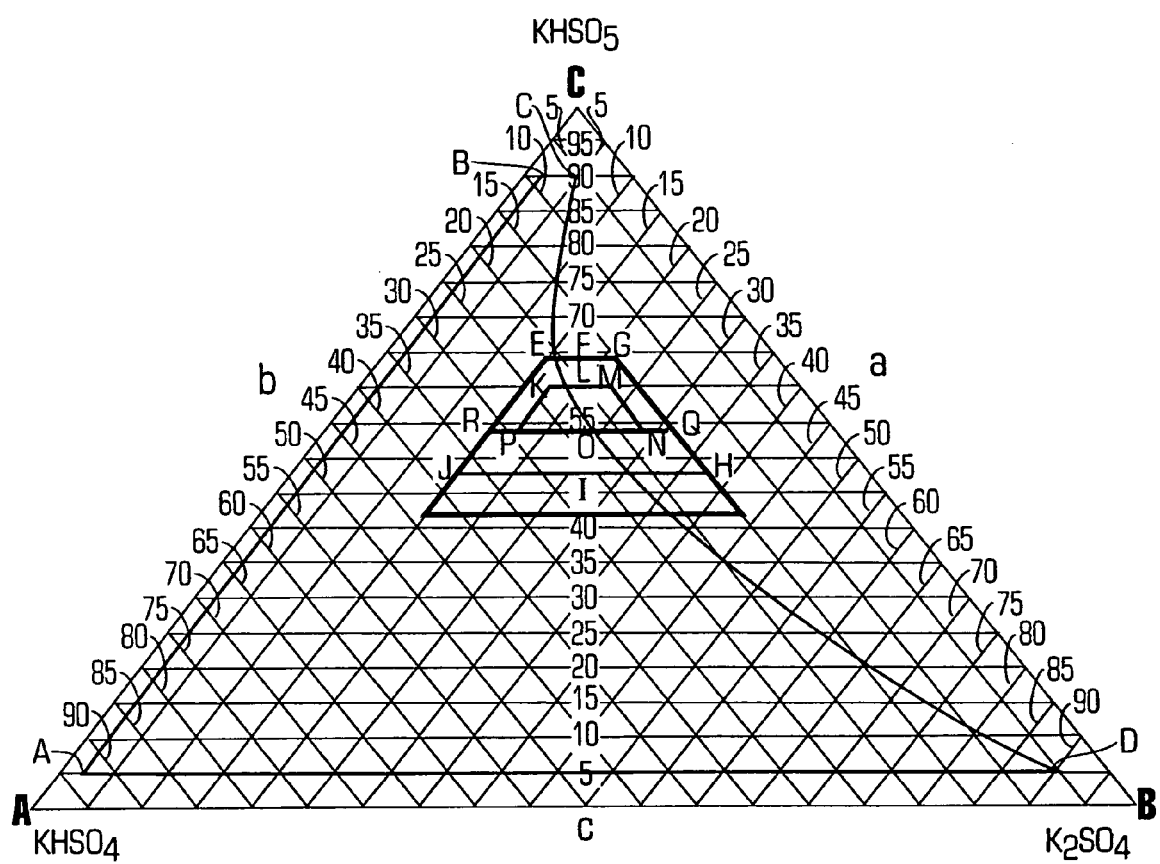
FIG. 2 is a tertiary diagram of a potassium monopersulfate composition that is suitable for the invention.

The partially neutralized triple salt resulting from the use of the resulting Caro's acid is further processed to produce a nonhygroscopic triple salt defined by the enclosed curve EGXYE, and more specifically EGHJE in FIG. 2 with <0.1 wt. % $K_2S_2O_8$, and having the general formula: $(KHSO_5)_x \cdot (KHSO_4)_y \cdot (K_2SO_4)_z$, where x+y+z=1 and x=0.53-0.64, y=0.15-0.33, and z=0.15-0.33.

Second Example of Low-Oxodisulfate PMPS Production

A PMPS composition was produced by introducing concentrated $H_2O_2$ into concentrated $H_2SO_4$ using a single stage reactor, then partially neutralizing with $K_2CO_3$, evaporated to a viscous slurry, mixed with 2 wt. % magnesium carbonate hydroxide pentahydrate, and dried using vacuum evaporation techniques, resulted in a stable, nonhygroscopic triple salt.

PMPS that is suitable for the invention may also be generated using the method and apparatus disclosed in U.S. patent application Ser. No. 10/878,176 filed on Jun. 28, 2004, which is incorporated by reference herein.

Figure 3:
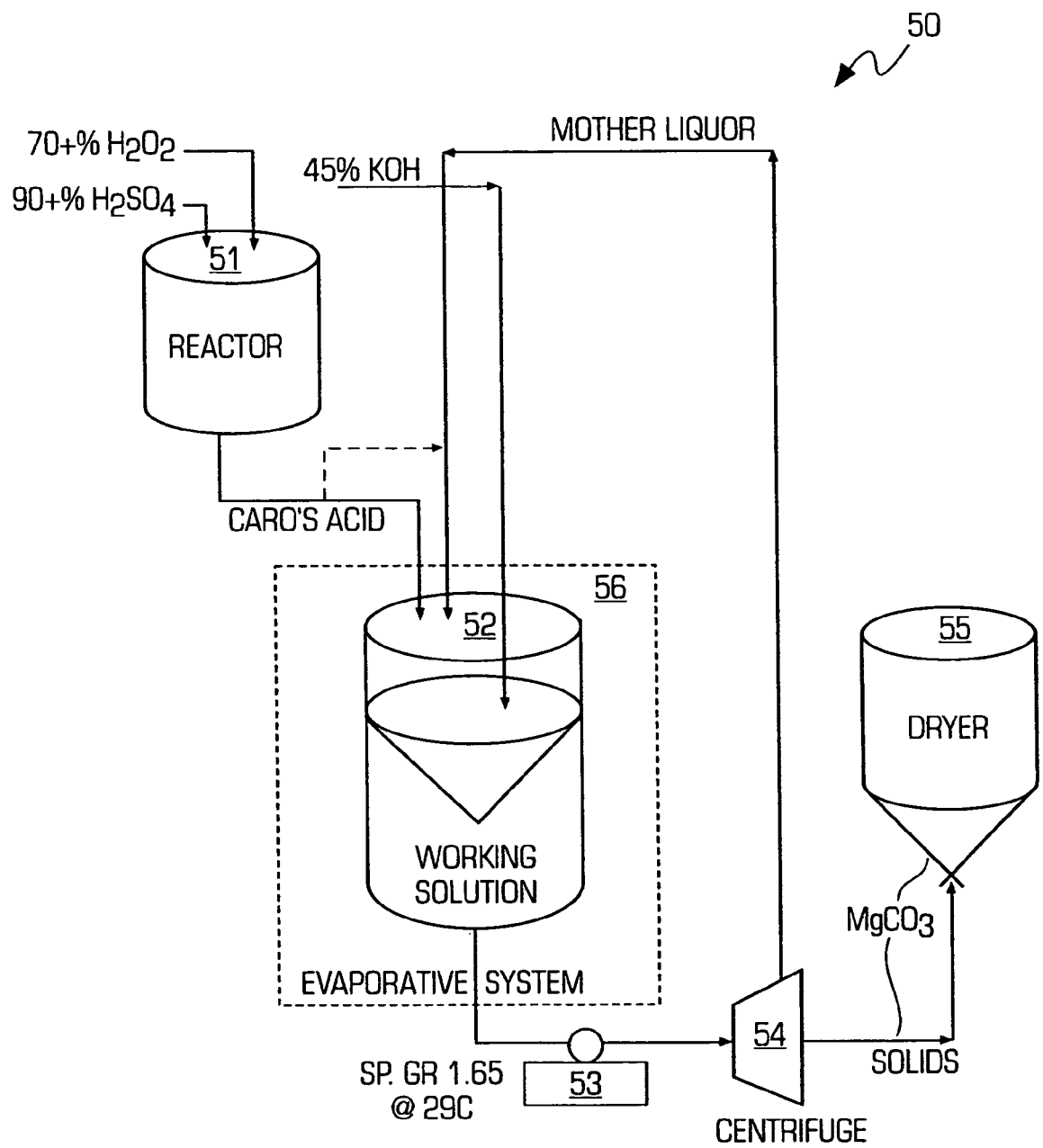
FIG. 3 is a continuous process system that may be used to produce the potassium monopersulfate composition that is suitable for the invention.

FIG. 3 is a continuous process system 50 that may be used to implement the invention. The process system 50 includes a reactor 51 where the sulfur source solution (e.g, $H_2SO_4$) and the peroxide solution are reacted to generate Caro's acid. In addition, the system 50 includes a working tank 52, a slurry pump 53, a centrifuge 54, and a dryer 55. The Caro's acid generated in the reactor 51 is combined with an alkali potassium salt in the working tank 52 to generate the PMPS triple salt, which is in the form of a slurry. The slurry containing the triple salt is pumped by the slurry pump 53 into the centrifuge 54, which separates the slurry into solids and mother liquor. The slurry contains at least 30 wt. % solids, as determined by the specific gravity of the slurry being greater than 1.55 at 29° C. The mother liquor is recycled back into the working tank 52. The mixture of the recycled mother liquor, the Caro's acid, the alkali potassium salt, and the slurry in the working tank 12 is herein referred to as the "working solution." The working solution is concentrated by being mixed in a vacuum evaporator 16 at a temperature less than or equal to 35° C.

The rate of the reaction between $H_2SO_5$ and $H_2O$ changes with temperature and with the order of reagent addition. Thus, by controlling the temperature and the order in which reagents are introduced to produce Caro's acid, a Caro's acid solution having an $H_2SO_5$ concentration that is substantially higher than that of currently available Caro's acid solutions can be produced. Furthermore, by shifting the reaction rate by manipulating temperature, the Caro's acid with high $H_2SO_5$ concentration can be stabilized. The stabilized Caro's acid solution may be used for various purposes, one of which is the production of the PMPS triple salt. The PMPS triple salt prepared with the high-$H_2SO_5$ Caro's acid solution has an A.O. level that is substantially higher than that of conventional PMPS triple salts.

In one aspect, the invention pertains to the reactor 51. The reactor 51 can be designed based on the discovery that the Caro's acid equilibrium reaction is affected by both the temperature and the order of reagent introduction. If the reactants are added in the right order under the right temperature to favor the formation of $H_2SO_5$, and if the resulting product is stabilized until all the reactants are added and the reaction is complete, Caro's acid production is optimized for high $H_2SO_5$ concentration. High $H_2SO_5$ concentration translates into decreased waste product and reduces the production cost. Furthermore, a high concentration of $H_2SO_5$ results in a higher concentration of $KHSO_5$, and a Caro's acid solution having a higher molar ratio of $KHSO_5/H_2SO_4$ can be used to prepare a stable, non-hygroscopic PMPS triple salt composition that has an active oxygen greater than the currently reported maximum of 4.3%. To prepare a useful version of the high-A.O. PMPS triple salt, the increased concentration of $H_2SO_5$ has to be stabilized, and the reactor of the invention allows $H_2SO_5$ to be stabilized.

Initially, when $H_2O_2$ is added to a solution of $H_2SO_4$, the molar ratio of $H_2SO_4$ is many times higher than the $H_2O_2$ and the rate of conversion in the forward reaction is high. When the temperature is kept to below or at 20° C., the rate of the reverse reaction (Reaction 1b) is suppressed, maintaining a high concentration of $H_2SO_5$. However, as the addition of $H_2O_2$ continues, the molar ratios of $H_2O_2$ and $H_2SO_4$ become closer to 1.0, the concentration of $H_2O$ increases, and the rate of the forward reaction is reduced. Thus, while the initial rate of reactants' conversion to $H_2SO_5$ is higher than that achieved if $H_2SO_4$ were to be added to $H_2O_2$ or if both reactants were combined at once, the benefits of controlling the order of addition are lost with time due to the effects of the reverse reaction. The reverse reaction ultimately lowers the active oxygen level in the PMPS triple salt that is produced with the resulting Caro's acid solution. Thus, measures are needed to stabilize the high-$H_2SO_5$ solution and suppress the reverse reaction.

The reactor achieves a high-$H_2SO_5$ level in a Caro's acid solution by allowing the reactants to mix a portion at a time. More specifically, the reactor is designed such that a peroxide concentration gradient forms in an oxyacid solution, as a function of distance from the inlet through which the peroxide solution is introduced. Due to the concentration gradient, only a portion of the oxyacid solution reacts with the peroxide at a given time. There is a stirring mechanism in the reactor that allows a controlled dissipation of this concentration gradient. The effect of the stirring is that after the peroxide and the oxyacid react to form $H_2SO_5$ in an area of high peroxide concentration, the $H_2SO_5$ is stirred away from the area where the reaction occurred, preventing the reverse process from being triggered and allowing more $H_2SO_5$ to form as more peroxide solution is introduced. Since the reverse reaction becomes significant only after the gradient dissipates (i.e., cannot stir the $H_2SO_5$ away to an area free of $H_2O_2$), the Caro's acid solution is moved to the next stage, e.g., the working tank 52 in FIG. 1, when the gradient dissipates.

Oleum, which is rich in $SO_3$, may be added to the $H_2O_2$ to convert water present in the peroxide solution since reducing the water concentration helps drive the forward reaction. Oleum also consumes some of the water that is released from the peroxide during the forward reaction. The reaction of oleum and water proceeds as follows:

$$H_2O + SO_3 \ggg H_2SO_4 \quad \text{(Reaction 2)}$$

As the molar ratio of oleum to $H_2O_2$ approaches 1.0, the ratio of free $H_2O$ to $SO_3$ is significantly reduced, and $SO_3$ begins reacting directly with $H_2O_2$ as illustrated by the following formula:

$$2\,SO_3 + H_2O_2 \ggg H_2S_2O_8 \quad \text{(Reaction 3)}$$

The production of $H_2S_2O_8$ is undesirable, as it may ultimately result in the formation of the irritant $K_2S_2O_8$.

In order to achieve high active oxygen, sufficient oleum is added to convert as much of the $H_2O_2$ as is economically permitted. Generally, the molar ratio of sulfur from oleum to peroxide is generally 1.1 to 1.6, with 1.18 being frequently recited.

To prevent or eliminate $K_2S_2O_8$, elaborate process control to balance the slurry chemistry between recycled mother liquor and neutralized Caro's acid solutions may be used. Also, triple salt solution may be treated with alkali potassium salts to precipitate and remove unwanted $K_2SO_4$, thereby enriching the $KHSO_5$ content. Alternatively, extra $H_2SO_4$ and KOH may be added to the triple salt solution to dilute the $K_2S_2O_8$.

In order to produce a stable, non-hygroscopic triple salt composition high in A.O. with substantially no $K_2S_2O_8$, several criteria must be met. First, it is desirable to stabilize $H_2SO_5$ immediately after its formation, to prevent reversion back to the reactants $H_2SO_4$ and $H_2O_2$ according to the reverse reaction of Reaction 1b. Second, residual (free) $H_2O$ must be minimized to maximize the yield in $H_2SO_5$. This can be accomplished by using reactants in the highest range of activity as possible.

Where oleum is used in any of the reaction steps, the feed-rate of oleum, and molar ratio of oleum to $H_2O_2$ must be controlled within specific guidelines to prevent formation of $H_2S_2O_8$ by Reaction 3 above.

Controlling the Dissolution Rate of PMPS

For applications where intermittent or continuous release of PMPS is desirable, the rate of PMPS dissolution is controlled. When the dissolution rate is controlled, the PMPS may be placed in the pool water or somewhere in the circulating system (e.g., a strainer of chemical erosion feeder) instead of being applied via inconvenient shock treatments. Some of the measures that are taken to control the release rate of PMPS into the water system include sizing/shaping the oxidizer tablet that contains the PMPS, depositing a coating material around the oxidizer tablet, and placing the oxidizer tablet in an enclosure. When modifying the PMPS to control the rate of dissolution, it is undesirable to add compounds that themselves would provide contaminants to the treated water.

1) Sizing and Shaping the Oxidizer Tablet

The dissolution rate is affected by the shape and size of the PMPS composition, which in turn affect the amount of surface area that is contacted by water. Thus, forming the coated composition into a pressure-formed tablet and appropriately adjusting the size controls the amount of surface area exposed to the composition of water and the rate at which the oxidizer dissolves. A "tablet," as used herein, can be of any shape including but not limited to a briquette, a sphere, a disk, a granule, a nugget, a shape having a regular or irregular polygonal cross section, or any convenient geometric shape.

2) Coating the Oxidizer Tablet

The oxodisulfate-free PMPS may be treated with a coating material that includes one or more of a silicate, a polysaccharide, polymaleic acid, polyacrylic acid, polyacrylamindes, polyvinylalcohols, polyethylene glycols, and their surrogates. The silicate material may contain, for example, one or more of sodium silicate, potassium silicate, lithium silicate, magnesium silicate, calcium silicate alkyl silicate, sodium borosilicate, potassium borosilicate, lithium borosilicate, magnesium borosilicate, calcium borosilicate, and alkyl borosilicate. The polysaccharide may contain, for example, cellulose, chitin, dextran, pectin, alginic acid, agar, agarose, carragenans, chitosan. The coating material is selected based on its solubility in the water. The coating material may be a mixture of components; for example, the coating material may be an organic polymer layer that contains about 0.1-10 wt. % polysaccharide.

During an experiment, the oxidizer tablet was treated with chitosan by atomizing a 2-wt. % solution of chitosan dissolved in a coating solvent containing an organic acid. A dilute acetic acid solution was used as the coating solvent for chitosan. The PMPS was fluidized in a fluidized drier to which the chitosan solution was atomized and directed countercurrent to the flow of air through the drier. The 2-wt. % chitosan coating was applied and allowed to dry. Sodium metasilicate coating and a combination coating containing both metasilicate and chitosan were used for comparison.

Small sample where measured and added to 200 ml of water at approximately 62° F. The samples were monitored until no powder was visible to the naked eye near the bottom of the beaker.

| Weight (gm) | Description | Lapsed Time (min:sec) |
|---|---|---|
| 0.15 | <425 micron PMPS | 2:45 |
| 0.15 | <425 micron w/3.5 wt % metasilicate coating | 3:52 |
| 0.15 | <425 micron PMPS w/2.5 wt % chitosan | 4:25 |
| 0.15 | <425 micron PMPS w/3.5 wt % metasilicate/1.5 wt % chitosan | 5:25 |

The results of this test illustrate that the dissolution rate of a highly soluble PMPS composition can be reduced by applying a coating of a proper composition. The wt. % of coating and the type of coating composition alter the dissolution rate.

Another benefit of PMPS composition employing a chitosan coating comes from the reactivation of chitosan during the dissolution process of the PMPS composition. The reactivation of chitosan contributes to the removal of organic matters in the water.

3) Forming an Enclosure

Figure 9A:
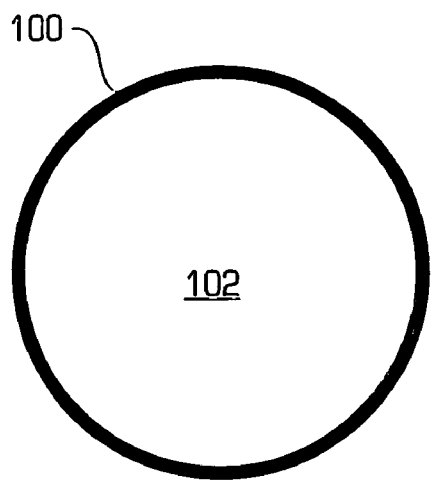
FIGS. 9A, 9B, and 9C are schematic illustrations of an enclosure that may be used to further control the oxidizer (e.g., PMPS) release rate.
Figure 9B:
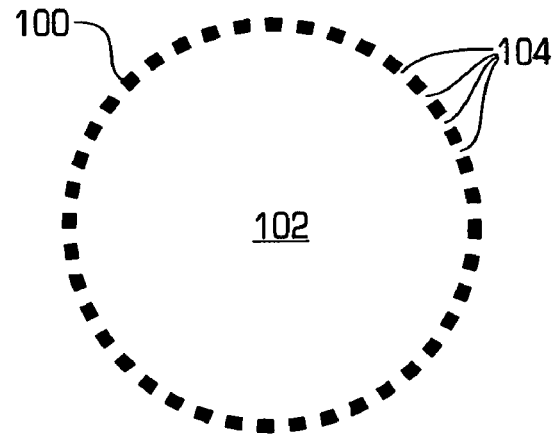
Figure 9C:
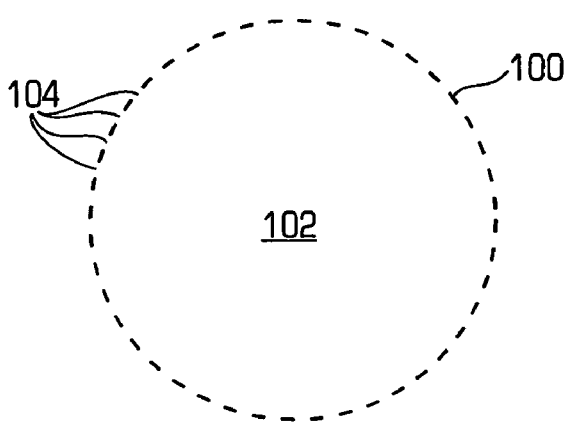

FIGS. 9A, 9B, and 9C are schematic illustrations of an enclosure 100 that may be used to further control the oxidizer (e.g., PMPS) release rate. The enclosure 100 may be formed or placed around the oxidizer tablet to control the rate at which the water enters the enclosure 100 and the rate at which the oxidizer is released into the water system.

As shown in FIG. 9A, the enclosure 100 is substantially solid and forms a space 102 where the oxidizer tablet (coated or not) can be placed. The enclosure 100 may be a rigid shell that maintains its shape or a malleable layer, and is not limited to any size or shape. When the enclosure 100 encounters water, it slowly forms fissures or pores 104 in the enclosure 100, as shown in FIG. 9B. The water seeps into the reactor 100 through the pores 104 and dissolves at least some of the oxidizer that is in the space 102. In addition to allowing water to seep into the space 102, the pores 104 allow the dissolved oxidizer to leave the enclosure 100. In one embodiment, the enclosure 100 retains its shape during and after the oxidizer release. In another embodiment, the enclosure 100 dissolves after there is substantially no oxidizer left in the space 102. In the latter embodiment, the enclosure 100 becomes thinner with time and eventually dissipates into the water. Details about the composition of the enclosure 100 are provided below.

The rates at which water seeps into the enclosure 100 and the oxidizer leaves the enclosure 100 are controlled by the size and number of pores 104 in the enclosure 100. It is not desirable for the enclosure 100 to disintegrate before substantially all of the oxidizer has been released at a controlled rate, for premature disintegration would result in the oxidizer being released too rapidly. One way to control the timing of the disintegration is to select an enclosure 100 whose solubility is a function of pH and place components in the space 102 that changes the pH of the space 102 when substantially all of the oxidizer is gone and replaced with water. The pH-altering components may go through a chemical reaction inside the enclosure 100, such that the product of the chemical reaction creates an environment with a different pH than the reactants. In that case, the chemical reaction may occur in the space 102 or along the inner surfaces of the enclosure 100.

The pores 104 allow the oxidizer to migrate out of the enclosure 100. Initially, osmotic pressure on the enclosure 100 increases, thereby squeezing the water into the reactor. A controlled permeation of the oxidizer from the inside of the reactor occurs to prevent the reactor wall from rupturing. If there is a reaction inside the enclosure 100 (e.g., reaction by the pH-changing components), gas(es) often produced during the chemical reaction may enhance the permeation of the oxidizer. The rate of permeation both into and out of the reactor is controlled by the size and the number of the pores in the enclosure 100.

Two properties are desirable in the material for the enclosure 100 are: 1) it allows for adequate permeation of water to dissolve the oxidizer, and 2) it allows the dissolved oxidizer to leave at a desired rate. Both of these properties depend on the surrounding conditions. Thus, the surrounding conditions should be taken into consideration when choosing the composition of the enclosure 100. Now, three exemplary embodiments of enclosures will be presented.

In a first embodiment, the enclosure 100 is made of a silicate-based material such as something that contains silicate, such as metasilicate, borosilicate, and alkyl silicate.

Silicate coatings are well established for providing a layer of protection to percarbonates and other oxidizing agents (e.g., bleaching agents used in laundry detergents). In laundry detergents, the inclusion of bleach precursors such as tetraacetyl-ethylenediamine or nonanoyl-oxybenzene sulfonate to enhance the bleaching performance in low temperatures is common. The hydrolysis of the precursors requires alkaline pH conditions. In such applications, due to the hydrolysis requirements and peroxygen chemistry, the internal and external solution used to dissolve the reactants is high in pH. Since the silicate coating is soluble under alkaline conditions, the integrity of the reactor wall is compromised and enclosure 100 does not improve the controlled release mechanism.

However, when used in a lower-pH environment or in formulations that create a low-pH environment inside the enclosure 100, silicates help control the oxidizer release rate. This usefulness of silicates remains uncompromised even if the external conditions are alkaline in pH, such as in the case of laundry water. At lower pH, where silica solubility is low, silica remains colloidal and forms a colloidal gel. When a monopersulfate (MPS) and a source of chloride such as NaCl are encased within a coating of silicate such as sodium silicate, then added to water, the water permeates through the pores 104 and dissolves the MPS. The resulting low pH (<5) from the dissolving MPS suppresses the dissolution rate of the surrounding silica, which remains as a colloidal gel.

In a second embodiment, the reactor wall is made of a generally hydrophobic polymer that initially included hydrophilic constituents. A mixture of hydrophobic and hydrophilic substance is applied to the oxidizer tablet and dried. Upon addition of water, the hydrophilic component dissolves and the hydrophobic polymer remains intact, forming a porous enclosure around the oxidizer tablet. Water permeates through the pores to reach and dissolve the oxidizer. Eventually, after substantially all of the oxidizer has left the enclosure 100, the hydrophobic substance might dissolve.

Applications where alkaline pH aquatic conditions are achieved or increased control of diffusion rates is desired can utilize hydrophobic polymers combined with hydrophilic agents. This hydrophobic polymer material may be useful with an alkaline-pH aquatic environment where the silicate coating is ineffective as a reactor. As mentioned above, hydrophobic polymers may possess hydrophilic portions, such as some hydrophilic functional groups inherent in the polymer structure. However, the hydrophobic polymers have a hydrophobic backbone that limits their solubility substantially, thereby allowing them to effectively function as a release-rate controller by maintaining the integrity of the reactor walls until the reaction inside has progressed beyond a critical point.

Examples of hydrophobic polymers include but are not limited to polyoxyethylene alcohols such as $R(OCH_2CH_2)_n$ OH, $CH_3(CH_2)_m(OCH_2CH_2)_nOH$, and polyoxyethylene fatty acid esters having the general formula RCOO $(CH_2CH_2O)_nH$, $RCOO(CH_2CH_2O)_nOCR$, oxirane polymers, polyethylene terephthalates, polyacrylamides, polyurethane, latex, epoxy, and vinyl, cellulose acetate. Suitable hydrophilic components include but are not limited to: polycarboxylic acids such as polymaleic acid, polyacrylic acid, and nonionic and anionic surfactants such as ethoxylated or sulfonated alkyl and aryl compounds.

The non-solvent is generally hydrophilic and is removed after the application of the coating to leave the pores 104. The amphipathic agent is used to combine the polymer coating with the hydrophilic non-solvent. The resulting coat is usually micro-porous but the process may be altered to form macro-pores. The ratio of solvent to non-solvent as well as non-solvent selection can be adjusted to provide varying degrees of pore size, distribution, and symmetry.

Polysiloxane emulsified in water using water-soluble surfactants provides for an effective coating in pH-sensitive applications. The emulsion is applied to the PMPS and then dried, as is performed in the application of the silicates. However, when exposed to water, the hydrophilic component dissociates, forming pores in the hydrophobic polysiloxane coating. The water then permeates into the enclosure 100, dissolving the PMPS. Due to the high chemical stability of the polysiloxane, the integrity of the reactor coating remains uncompromised in alkaline pH conditions.

In a third embodiment, the enclosure 100 is a hydrophobic and porous membrane. To further improve on the diffusion rates by providing for a controlled porosity and pore symmetry, the hydrophobic components such as cellulose acetate can be dissolved in a solvent and combined with a non-solvent that is amphipathic or has a hydrophilic functionality. After forming the coating, both the solvent and non-solvent are removed (e.g., evaporated) leaving a coat with specific porosity. The porosity can be altered by controlling the ratio and types of non-solvent and solvent to the hydrophobic component. For example, addition of ethanol into a mixture of acetone/water-magnesium perchlorate (solvent/non-solvent mixture) produces asymmetrical pores. "Solvents" have the ability to dissolve the hydrophobic polymer while being soluble in the non-solvent.

The hydrophobic component can be any number of thermoplastics and fiber forming polymers or polymer precursors, including but not limited to polyvinyl chloride, polyacrylonitrile, polycarbonate, polysulfone, cellulose acetates, polyethylene terephthalates, and a wide variety of aliphatic and aromatic polyamides, and polysiloxane. Using this coating technology, a membrane with controlled porosity is produced. Representative synthetic polymers include polyphosphazines, poly(vinyl alcohols), polyamides, polycarbonates, polyalkylenes, polyacrylamides, polyalkylene glycols, polyalkylene oxides, polyalkylene terephthalates, polyvinyl ethers, polyvinyl esters, polyvinyl halides, polyvinylpyrrolidone, polyglycolides, polysiloxanes, polyurethanes and copolymers thereof. Other suitable polymers include, but are not limited to, methyl cellulose, ethyl cellulose, hydroxypropyl cellulose, hydroxypropyl methyl cellulose, hydroxybutyl methyl cellulose, cellulose acetate, cellulose propionate, cellulose acetate butyrate, cellulose acetate phthalate, carboxymethyl cellulose, cellulose triacetate, cellulose sulfate sodium salt, poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly (methyl acrylate), poly(isopropyl acrylate), poly(isobutyl acrylate), poly(octadecyl acrylate) polyethylene, polypropylene, poly(ethylene glycol), poly(ethylene oxide), poly (ethylene terephthalate), polyvinyl acetate), polyvinyl chloride, polystyrene, polyvinyl pyrrolidone, and polyvinyiphenol. Representative bioerodible polymers include polylactides, polyglycolides and copolymers thereof, poly(ethylene terephthalate), poly(butic acid), poly(valeric acid), poly(lactide-co-caprolactone), poly[lactide-co-glycolide], polyanhydrides, polyorthoesters, blends and copolymers thereof.

More specifically, cellulose acetate phthalate such as CA-398-10NF sold by Eastman Chemical Company may be used a the enclosure material. Under low pH conditions like those previously described for production of N-chlorosuccinimide, the coating remains stable. However, when the oxidizer is diffused out of the enclosure 100, the higher pH (>6.0) dissolves the enclosure 100. The porosity can be controlled by dissolving the cellulose in a solvent, then adding an effective amount of non-solvent. After application of the coating, the solvent and non-solvent are removed via evaporation, leaving behind a membrane with a distinct porosity. The porosity can be further altered in symmetry, number of pores, and size of pores by altering the coating components and processing. For example, a decrease in solvent to polymer (S/P) ratio, an increase in nonsolvent/solvent (N/S) ratio, an increase in nonsolvent/polymer (N/P) ratio in the casting solution composition, and a decrease in the temperature of the casting solution tend to increase the average size of the pores on the surface of resulting membranes. Further, an increase in S/P ratio in the casting solution composition, and an increase in the temperature of the casting solution, tend to increase the effective number of such pores on the membrane surface.

Some applications may benefit from a membrane that provides a long term treatment with antimicrobial agents. After the oxidizer tablet is extruded, the enclosure 100 is formed by either directly applying a film-forming membrane and evaporating off any solvents (including water) and non-solvent in the membrane. Alternatively, after the oxidizer tablet is extruded, the phase inversion process may be used to produce long fibrous solvent-activated reactors that can be woven or combined with woven materials.

To further improve the stability of the formed polymer membrane, an alloy component can be incorporated into the membrane to form an alloyed reactor wall membrane. For example, addition of poly(phenylene oxide dimethyl phosphonate) to cellulose acetate on a 1:1 w/w mixture can increase membrane tolerance from a pH of <8 to a pH of 10-10.7 for extended usage. An alloying compound is typically an organic component that is combined with the primary hydrophobic component that enhances the polymer membrane's chemical and/or thermal stability. The alloying compound can also be a cross-linking agent such as triflic acid with phosphorous pentoxide, trifluoromethansulfonate, etc., or a plasticizer.

In some embodiments, a cross-linking agent that enhances the structural integrity and rigidity with a polymer precursor such as styrene is included in the reactor wall. Styrene, a cross-linking agent such as divinylbenzene, a solvent, and non-solvent are mixed and applied to form an effective film, followed by the step of initiating polymerization by applying a persulfate or activating peroxide solution before removing the solvent and non-solvent by evaporative drying. The persulfate may be applied during the removal of the solvent and non-solvent, in situ. After the drying, a plastic coating layer having a micro- or macro-porous structure with substantially improved rigidity and strength is obtained.

A plasticizer may also be used to increase the pliability as well as alter the hygroscopicity of the membrane coating.

Alloying compounds such as plasticizers and cross-linking agents may be incorporated into the composition of the enclosure 100 to further improve its structural integrity and/or stability across different temperature and pH ranges. As stated above, the alloying component can also be a cross-linking agent such as triflic acid with phosphorous pentoxide, trifluoromethansulfonate, and the like.

One oxidizer tablet may be surrounded by more than one enclosure 100. Also, a single oxidizer tablet may have one coating and one enclosure. For example, a silicate-coated-core can be further treated with a second coating of chitosan to improve its fluidity and hygroscopic properties. Upon exposure to a bulk quantity of water, the chitosan is dissolved and the silica-coated reactor is exposed. Also, where enhanced storage stability is required, such as high humidity exposure, a secondary coating that enhances the hygroscopicity of the reactor-encased composition may be applied. The invention is not limited to a specific number of enclosures 100. It is also possible to have multiple coatings and/or multiple enclosures, depending on what the desired release rate is.

A composition may be applied to the oxidizer tablet in the form of an aerosol, a liquid, an emulsion, a gel, or a foam to form the enclosure 100. The preferred form of coating depends on the composition of the coating being applied, the application equipment, and conditions. The enclosure generally comprises from 0.2 to 10% of the total weight of the oxidizing composition. However, the actual amount of membrane coating can vary based on the size of the reactor, porosity, and the like.

In one aspect, the invention is a method of producing the reactor described above, and also a method of using the reactor to treat a water system. The invention is a method of releasing oxidizers, biocides and/or virucidal agents in-situ at a controlled rate. The controlled release is triggered when the reactor is exposed to the body of water that is to be treated by the products of the reaction.

The oxidizer tablet that is formed as described above is coated with an effective amount of the enclosure material. An "effective amount" of enclosure material takes into consideration the solubility characteristics of the enclosure composition under the conditions in the application so as to ensure that the structural integrity of the reactor remains sufficiently intact until substantially all of the PMPS is out of the enclosure 100. The enclosure material may be applied by using any effective means of distributing the material over the surface of the oxidizer tablet, such as spray coating in a fluidized bed, or applying a foam or liquid containing the enclosure material and mixing. The enclosure material is effectively applied in the form of liquid, foam, gel, emulsion and the like, and may be applied, for example, by aerosol, spray, and immersion. The enclosure material may be applied with a mechanical mixing device such as a blender/mixer.

Once applied, the enclosure material is dried by using an effective means of drying, such as a fluidized drier or a tray drier, rotary drier, fluidized bed drier, etc. Preferably, the enclosure material is coated on and dried in a continuous fluidized bed drier. The fluidized bed drier can incorporate multiple stages of drying to apply multiple applications of coating, perform different steps in the coating process (i.e., coating, polymerization, evaporation) and the like under continuous or batch processing. Generally, the product temperature during the enclosure composition application should not exceed 100° C., and is preferably at or below 70° C.

When using the membrane-type enclosure, the application of the coating should occur at <50° C. and preferably <30° C. depending on the solvent and non-solvent that are used. The order of application, evaporation, drying, etc. of the enclosure material varies based on the types of polymers, solvents, non-solvents and techniques used to produce the porous membrane. For example, a cellulose acetate membrane is effectively applied by first dissolving the cellulose polymer in a solvent, then adding a non-solvent such as water and magnesium perchlorate to produce the gel. The gel is coated on the core by spraying or otherwise applying a thin film of gel onto the surface of the core, then evaporating the solvent and the volatile components of the non-solvent.

A polyamide membrane can be produced by using the method that is commonly referred to as the "phase inversion process." The phase inversion process includes dissolving a polyamide in a solvent such as dimethyl sulfoxide to form a gel, applying the gel to form a thin film, then applying the non-solvent to coagulate the polymer. Then, the solvent and non-solvent are evaporated.

Exemplary Embodiments

Figure 10:
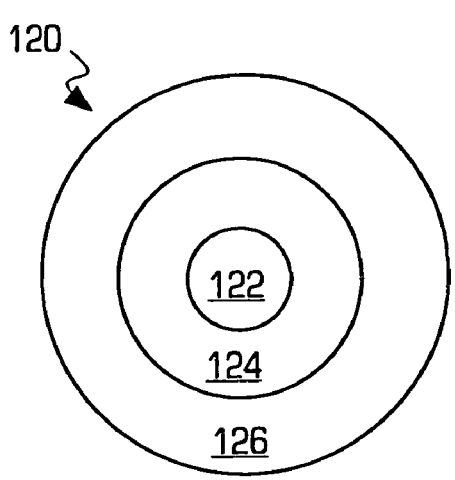
FIGS. 10, 11, and 12 are different embodiments of an oxidizing composition in accordance with the invention.

FIG. 10 is a first embodiment of an oxidizing composition 120 in accordance with the invention. The oxidizing composition 120 has an oxidizer tablet 122 in the core, a coating material 124 around the core, and an enclosure 126 around the coating material 124. Water seeps in through pores in the enclosure 126, dissolves the coating material 124, and reaches the oxidizer tablet 122. As the oxidizer tablet 122 dissolves, the solution leaves the oxidizing composition 120 through the pores in the enclosure 126 at a controlled rate. The overall release rate is a function of the time it takes for the coating material 124 to dissolve as well as the size and number of the pores.

Figure 11:
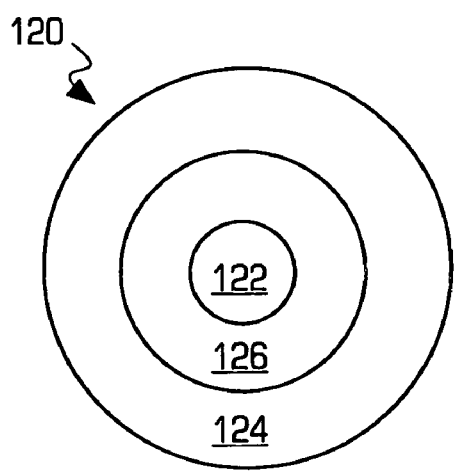

FIG. 11 is a second embodiment of the oxidizing composition 120 in accordance with the invention. The oxidizing composition 120 has an oxidizer tablet 122 in the core, an enclosure 126 around the oxidizer tablet 122, and the coating material 124 around the enclosure 126. As in the embodiment of FIG. 10, the pores in the enclosure 126 and the rate at which the coating material 124 dissolves control the overall release rate of the oxidizer tablet 122 into the surrounding water.

Figure 12:
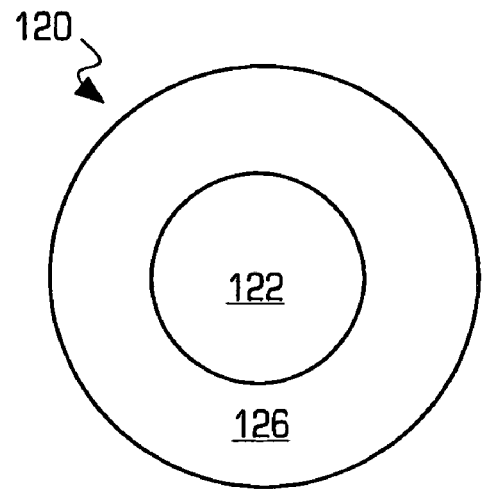

FIG. 12 is a third embodiment of the oxidizing composition 120 in accordance with the invention. In this embodiment, the oxidizer tablet 122 is surrounded only by the enclosure 126, and there is no coating material 124. The overall rate of release is controlled by the size and number of the pores on the enclosure 126.

Figure 13:
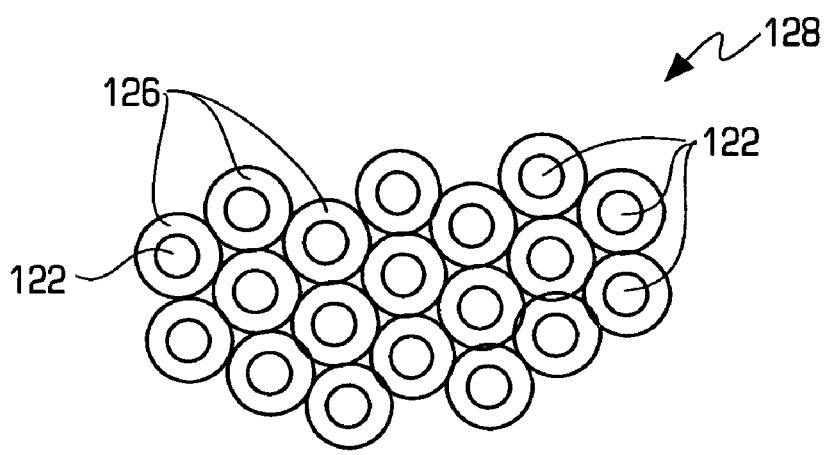
FIGS. 13 and 14 are different embodiments of an oxidizing product including a cluster of oxidizing compositions.

FIG. 13 demonstrates that a plurality of the oxidizing compositions 120 may be clustered to form an oxidizing product 128. The oxidizing product 128 may be of any chosen shape and size that is easy to use, such as a puck or a briquette. Each oxidizer tablet 120 has an enclosure 126. The oxidizer tablets are held together by a water-soluble material (e.g., the coating material 124) such that when the oxidizing product 128 is placed in contact with a body of water, the oxidizing compositions 120 become separated and released at a controlled rate as more of the water-soluble material that holds them together is dissolved. Each oxidizer tablet 120 that separates from the cluster floats in the water, slowly releasing the oxidizer tablet 122 as it dissolves.

Figure 14:
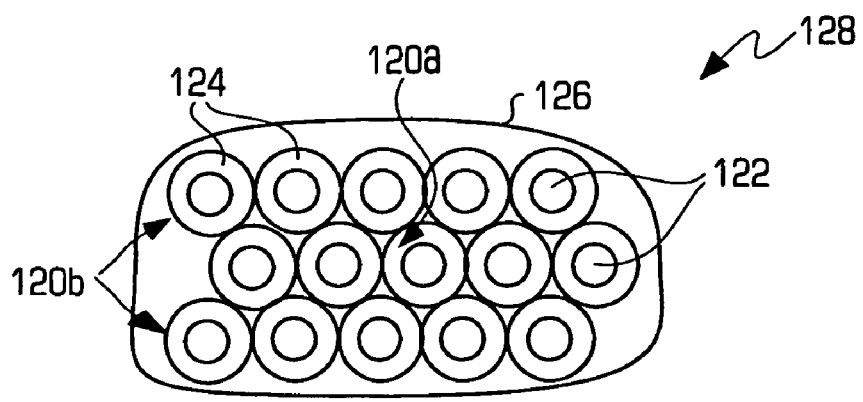

FIG. 14 demonstrates that multiple oxidizer tablets may be combined within the same enclosure 126. Each of the oxidizing compositions 120 may be coated with the coating material 124. As water reaches the coated oxidizing compositions 120, the coating material 124 slowly dissolves and releases the oxidizer tablet 122. The oxidizing compositions 120 may be arranged in layers, so that the innermost oxidizer compositions 120 (shown as oxidizing compositions 120a) release their oxidizer tablet 122 only after the outer oxidizing comositions 120 (shown as oxidizing compositions 120b) release their oxidizer tablet 122.

Water Treatment Using the Oxidizer Tablets

The PMPS tablets described are applied to a water system by being inserted into a feeder, strainer, or any location in the pool or pool circulating system that is continuously or periodically immersed in the water to be treated. This method allows for controlled release of the composition to provide oxidation of COD regardless of the presence of contaminants (e.g., bathers), without causing irritation to the bathers.

Illustration of the Benefits of Adding Pmps to an Organic Laden Water

Figure 4:
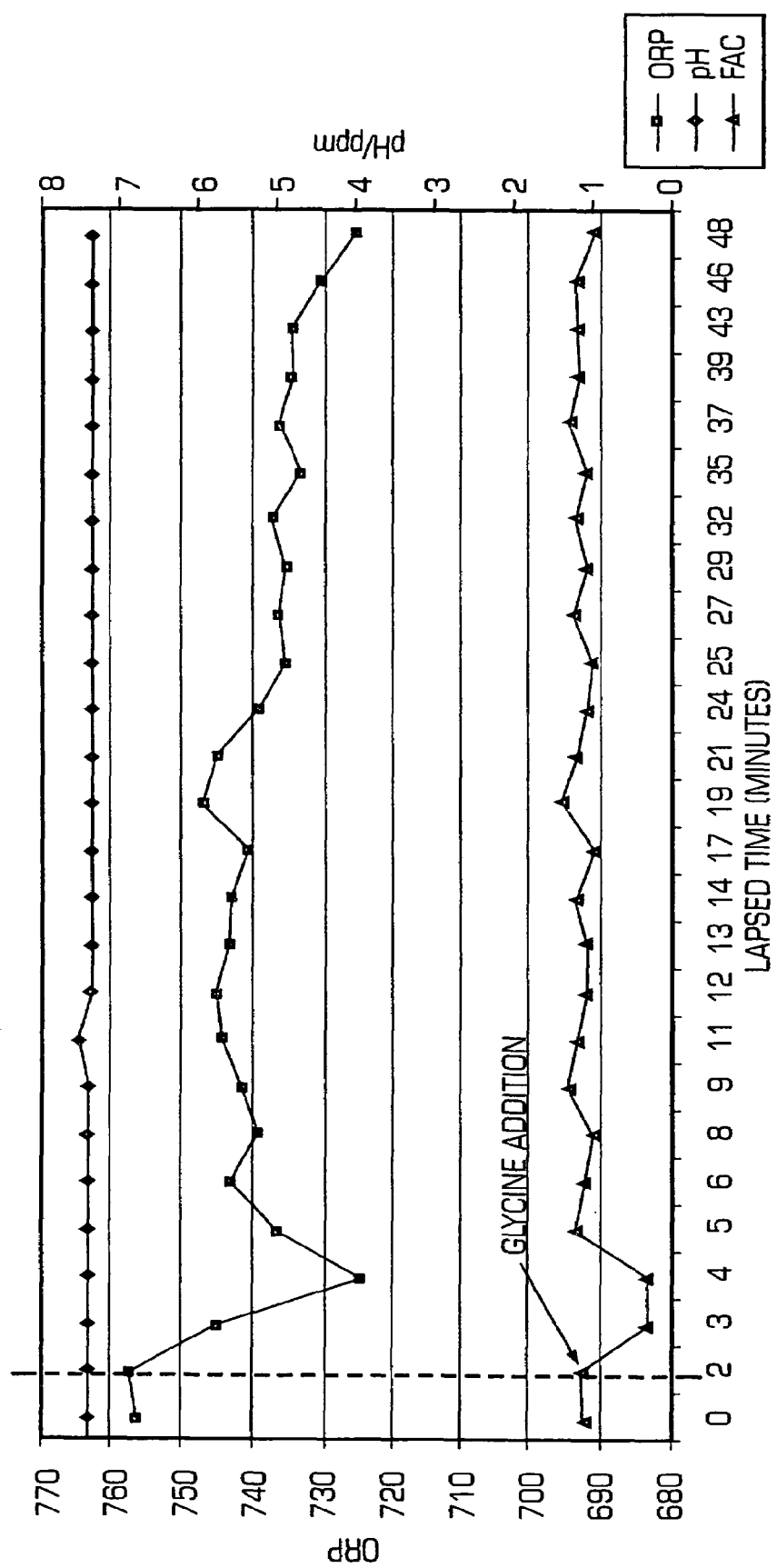
FIG. 4 is a plot showing the effect of organic contaminants and chlorine addition on the Oxidation Reduction Potential (ORP) of a water system.

FIG. 4 is a plot showing the effect of organic contaminants and chlorine addition on the Oxidation Reduction Potential (ORP) of a water system. The organic contaminants is provided in the form of glycine in the case illustrated in FIG. 3. For a given pH and Free Available Chlorine (FAC), the ORP is severely affected by the presence of organic contaminants (chemical oxygen contaminants (COD)). After 45 minutes of continuous treatment with chlorine, the system still can not recover to the equilibrium conditions achieved prior to the glycine addition.

Figure 5:
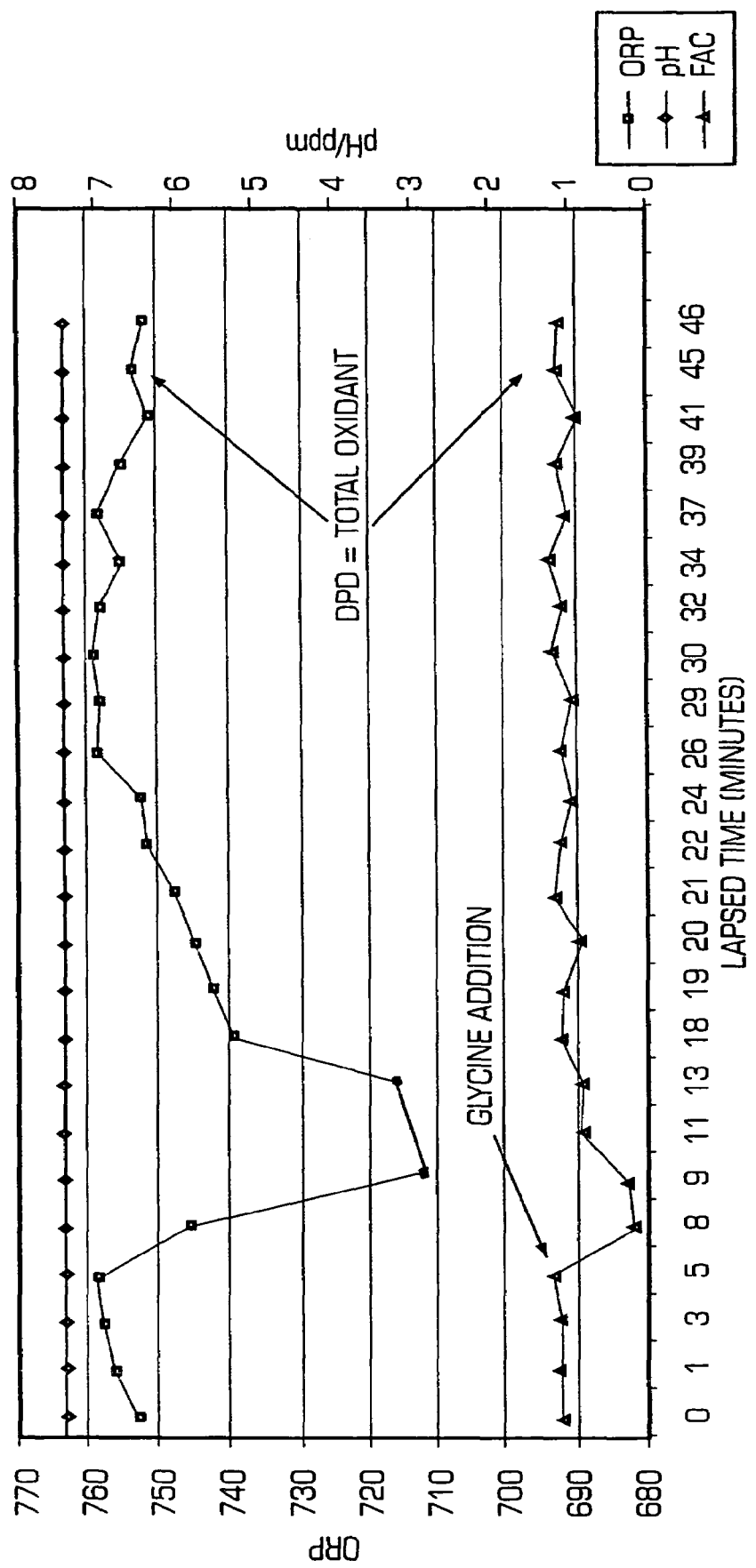
FIG. 5 is a plot showing the effect of chlorine and PMPS addition on the water system of FIG. 3.

FIG. 5 is a plot showing the effect of chlorine and PMPS addition on the water system of FIG. 3. As shown, using chlorine and PMPS affects the ORP range compared to the case where chlorine is used alone. During the treatment period, the ORP is sustained at substantially higher levels than the PMPS-free system. FIG. 5 also illustrates that the system treated with the PMPS and a sustained chlorine level achieved pre-glycine equilibrium conditions in far less time than is achievable by chlorine alone.

Results illustrate that PMPS is far more effective at reducing the rate of decomposition of the organic contaminants application if PMPS is added while contaminants (e.g., bathers) is present than if PMPS is added to a pool/spa during evacuation. When added to a water system while contaminants is present, the PMPS also supports higher ORP than when the PMPS is added during evacuation, and the higher ORP correlates with improved disinfection rates.

Determination of $K_2S_2O_8$

To exploit the above effects of PMPS on water systems, the PMPS composition must be substantially free of harsh irritants such as $K_{2\,S2}O_8$. To be able to use the PMPS composition without evacuating the pool/spa, or to increase the dosage that is used while the water system is not being used, the PMPS must be substantially free of $K_2S_2O_8$.

Figure 6:
FIG. 6 is an X-Ray Diffraction Spectroscopy result of a potassium oxodisulfate sample showing the characteristic peak at 24.06 degrees 2θ.

FIG. 6 is an X-Ray Diffraction Spectroscopy result of a sample of potassium persulfate (also called potassium oxodisulfate, $K_2S_2O_8$), whereby a signature peak specific to $K_2S_2O_8$ is indicated.

Figure 7:
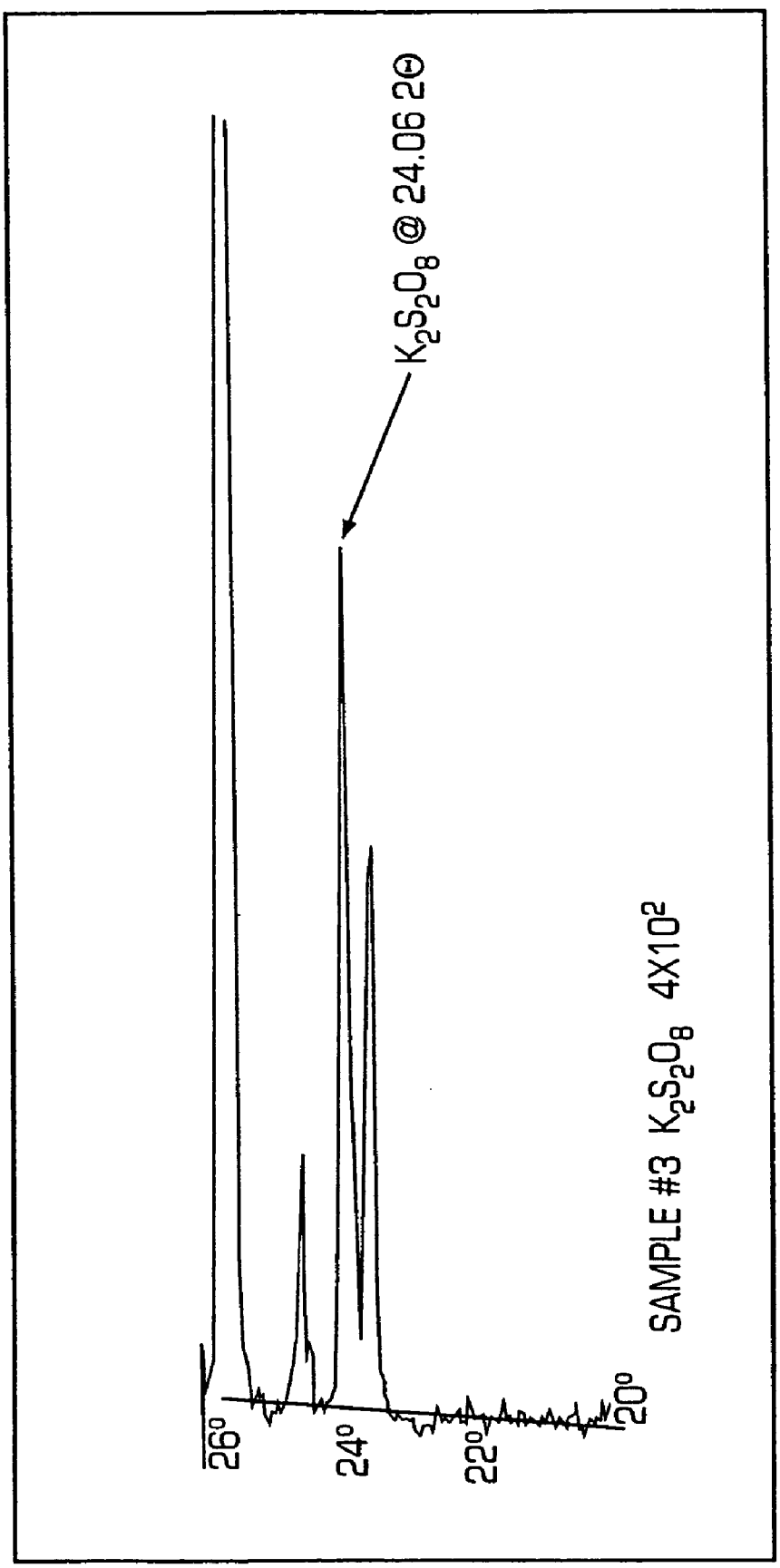
FIG. 7 is an X-Ray Diffraction Spectroscopy result of the commercially available Oxone® potassium monopersulfate triple salt.

FIG. 7 is an X-Ray Diffraction Spectroscopy result of a sample of commercially available triple salt sold under the brand name Oxone® by E.I. DuPont. The signature peak for $K_2S_2O_8$ is indicated in the Figure.

Figure 8:
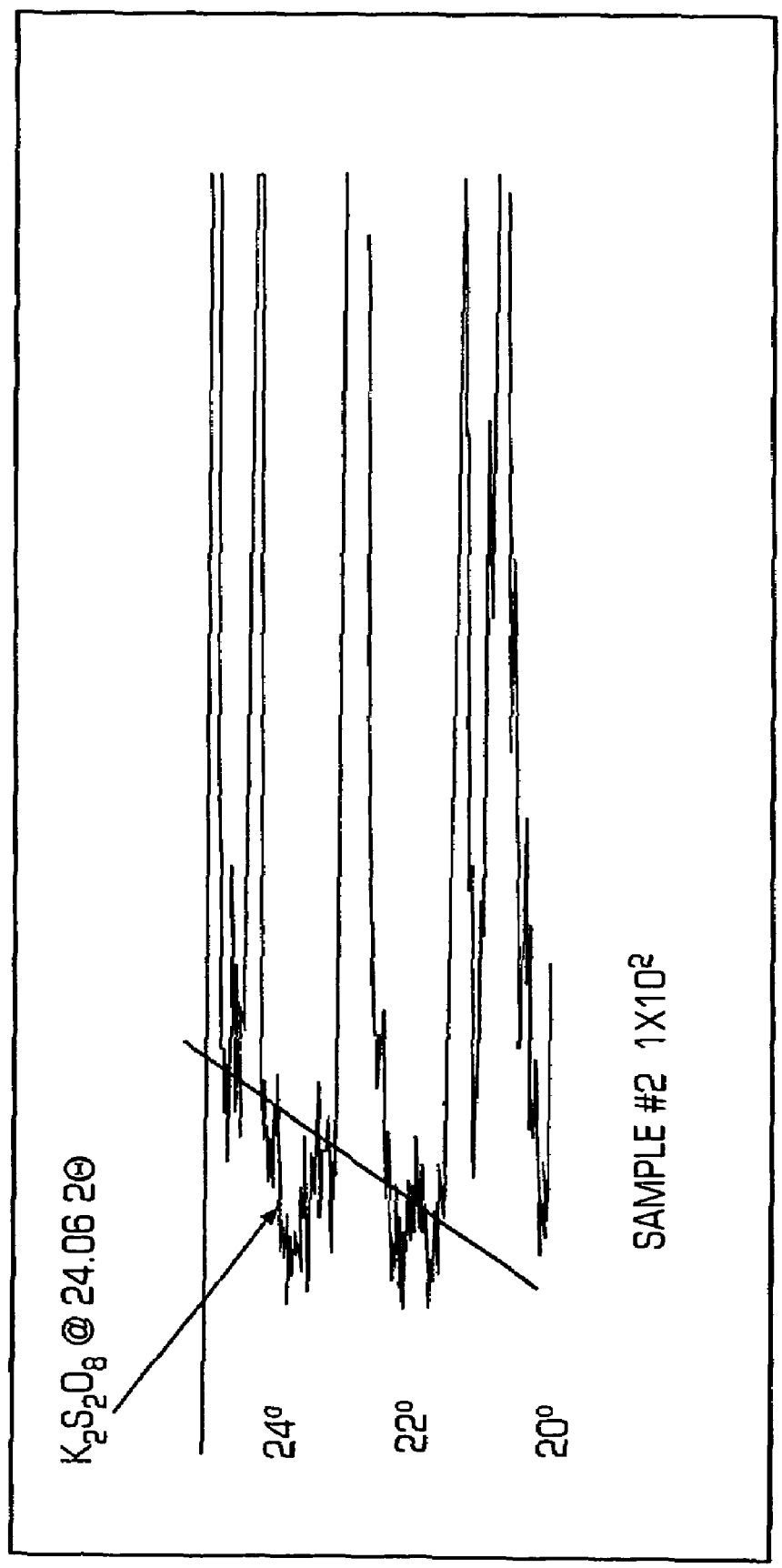
FIG. 8 is an X-Ray Diffraction Spectroscopy result of a potassium monpersulfate triple salt produced according to the methods of the invention.

FIG. 8 is an X-Ray Diffraction Spectroscopy result of the PMPS composition produced by using the process described above. The lack of the characteristic $K_2S_2O_8$ peak illustrates that the triple salt is free of detectable levels of $K_2S_2O_8$.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

What is claimed is:

1. An oxidizing composition comprising; a potassium monopersulfate oxidizer tablet; and an enclosure with a porous membrane surrounding the oxidizer tablet such that when the enclosure is placed in contact with a solvent, the solvent enters the enclosure through the porous membrane and dissolves the oxidizer tablet to form an oxidizing solution, which leaves the enclosure through the porous membrane.

2. The composition of claim 1, wherein the porous membrane comprises a hydrophobic polymer.

3. The potassium monopersulfate-containing composition of claim 1 further comprising a layer of coating material around the oxidizer tablet, wherein the layer contains at least one of a silicate, cellulose, chitin, chitosan, polymaleic acid, polyacrylic acid, polyacrylaminedes, polyvinylalcohols, polyethylene glycols, and their surrogates.

4. The composition of claim 3, wherein the coating material is selected based on its solubility in the solvent.

5. The composition of claim 1 further comprising a layer of polysaccharide material around the oxidizer tablet.

6. The composition of claim 5, wherein the polysaccharide material is one or more of: cellulose, dextran, pectin, alginic acid, agar, agarose, carragenans, chitin, and chitosan.

7. The composition of claim 1 further comprising an organic polymer layer containing about 0.1-10 wt. % polysaccharide.

8. The composition of claim 3, wherein the silicate in said layer contains one or more of sodium silicate, potassium silicate, lithium silicate, magnesium silicate, calcium silicate alkyl silicate, sodium borosilicate, potassium borosilicate, lithium borosilicate, magnesium borosilicate, calcium borosilicate, and alkyl borosilicate.

9. The composition of claim 8 further comprising depositing a silicate layer over the potassium monopersulfate composition, wherein no more than about 10 wt. % of the silicate layer is silicate or borosilicate.

10. The potassium monopersulfate composition of claim 1, wherein the oxidizer tablet has an average diameter of less than 425 $\mu m$.

11. The potassium monpersulfate composition of claim 1, wherein the oxidizer tablet comprises potassium monopersulfate including $KHSO_5$, $KHSO_4$, and $K_2SO_4$.

12. The composition of claim 11, wherein the $KHSO_5$ makes up about 43 to about 75 wt. % of the oxidizer tablet.

13. The composition of claim 1, wherein the oxidizer tablet comprises an alkali magnesium salt, the alkali magnesium salt being selected from a group consisting of $Mg(OH)_2$, $MgCO_3$, $Mg(HCO_3)_2$, $MgO$, $(MgCO_3)_4$-$Mg(OH)_2$-$5H_2O$, $CaMg(CO_3)_2$, $MgO$-$CaO$, and $Ca(OH)_2$-$MgO$ and making up no more than about 10 wt. %.

14. The composition of claim 1, wherein the oxidizer tablet comprises: potassium monopersulfate; and $K_2S_2O_8$ at a concentration that is lower than about 0.5 wt. %.

15. The composition of claim 1 further comprising depositing a coating material between the oxidizer tablet and the enclosure, wherein the coating material contains a polysaccharide material.

16. The composition of claim 1 further comprising depositing a coating material around the enclosure, wherein the coating material contains a polysaccharide material.

17. An oxidizing product comprising: a plurality of oxidizer tablets; a layer of coating material around each of the plurality of oxidizer tablets; and an enclosure around the plurality of oxidizer tablets, the enclosure having pores such that when the enclosure is placed in contact with a solvent, the solvent enters the enclosure through the pores and dissolves the coating material and the oxidizer tablets to form an oxidizing solution, which leaves the enclosure through the pores.

18. The product of claim 17, wherein the oxidizer tablet comprises a potassium monopersulfate composition.

19. The product of claim 17, wherein the enclosure comprises a hydrophobic polymer.

20. The product of claim 17, wherein the enclosure comprises a porous membrane.

21. An oxidizing product comprising: a plurality of oxidizer tablets containing an oxidizer; an enclosure around each of the plurality of oxidizer tablets, the enclosure having pores such that when the enclosure is placed in contact with a solvent the solvent enters the enclosure through the pores and dissolves the oxidizer tablets to form an oxidizing solution, which leaves the enclosure through the pores; and a layer of coating material deposited over the plurality of oxidizer tablets and the enclosure, wherein the coating material is soluble in the solvent.

22. The product of claim 21, wherein the oxidizing agent is a potassium monopersulfate composition.

23. The product of claim 21, wherein the enclosure comprises one of a hydrophobic polymer and a porous membrane.

24. A method of making an oxidizing composition that reduces the chemical oxygen demand of a water system containing organic contaminants, the method comprising: forming a potassium monopersulfate oxidizer tablet; and enclosing the oxidizer tablet with an enclosure having a porous membrane such that when the enclosure is placed in contact with a solvent, the solvent enters the enclosure through the porous membrane and dissolves the oxidizer tablet to form an oxidizing solution, which leaves the enclosure through the porous membrane.

25. The method of claim 24 further comprising shaping the oxidizer tablet into a desired shape and size, wherein the shape and size are selected based on the target rate at which the oxidizer tablet dissolves in the solvent.

26. The method of claim 24, wherein the oxidizer tablet contains potassium monopersulfate composition, and wherein forming the potassium monopersulfate composition comprises: reacting $H_2SO_5$ with a potassium alkali salt to produce a slurry containing solids; and drying the solids at a temperature below 90°C.

27. The method of claim 26 further comprising producing $H_2SO_5$ by reacting $H_2O_2$ with $H_2SO_4$ at a $H_2SO_4$ to $H_2O_2$ molar ratio of at least one.

28. The method of claim 24 further comprising depositing a coating material around the oxidizer tablet by applying a silicate material in the form of foam, liquid, colloidal suspension, or a solid.

29. The method of claim 28 further comprising drying the silicate material at a temperature of <90°C.

30. The method of claim 26, wherein enclosing the oxidizer tablet comprises forming a layer that contains a hydrophobic polymer or a porous membrane around the oxidizer tablet.

31. A method of reducing the chemical oxygen demand of a water system containing organic contaminants, the method comprising: obtaining an oxidizing composition containing potassium monopersulfate enclosed in an enclosure, wherein the potassium monopersulfate has $K_2S_2O_8$ at a concentration that is lower than about 0.5 wt. %.; and contacting the oxidizing composition with the water system while a source that generates the organic contaminants is in the water system.

32. The method of claim 31, wherein contacting the oxidizing composition with the water system comprises dissolving the oxidizing composition in the water system.

33. The method of claim 31, wherein contacting the oxidizing composition with the water system comprises placing the tablet in continuous contact with the water system until the tablet is dissolved.

34. The method of claim 31, wherein contacting the oxidizing composition with the water system comprises placing the tablet in contact with the water system periodically.

35. The method of claim 31, wherein contacting the oxidizing composition with the water system comprises: placing the oxidizing composition in a fixed location through which water flows; and circulating a stream in the water system such that the stream flows over the oxidizing composition.

36. The method of claim 31, wherein the oxidizing composition comprises a polysaccharide material.

37. The method of claim 36, wherein the polysaccharide material is selected from a group consisting of cellulose, dextran, pectin, alginic acid, agar, agarose, carragenans, chitin, and chitosan.

38. A kit for cleaning a water system containing organic contaminants, the kit comprising: a potassium monopersulfate tablet placed in a porous enclosure, wherein the enclosure contains a hydrophobic polymer or a membrane; and instructions to add the enclosed tablet to the water system during use of the water system.

39. The kit of claim 38, wherein the potassium monopersulfate tablet is coated with a polysaccharide material.

40. The kit of claim 39, wherein the polysaccharide material is selected from a group consisting of: cellulose, dextran, pectin, alginic acid, agar, agarose, carragenans, chitin, and chitosan.

41. The method of claim 39, wherein the polysaccharide material comprises an organic polymer layer containing about 0.1-10 wt. % polysaccharide.

42. The kit of claim 38, wherein the potassium monopersulfate tablet is coated with a membrane.

43. The kit of claim 42, wherein the membrane comprises one or more of cellulose acetate(s), polyethylene phthalate, polyamide, polycarbonate, polysulfonate, and polysiloxane.

* * * * *